United States Patent
Fillipi et al.

(10) Patent No.: US 9,262,176 B2
(45) Date of Patent: *Feb. 16, 2016

(54) SOFTWARE EXECUTION USING MULTIPLE INITIALIZATION MODES

(71) Applicant: ORACLE INTERNATIONAL CORPORATION, Redwood Shores, CA (US)

(72) Inventors: Steven M. Fillipi, Aurora, CO (US); Joseph Michael Guerra, Littleton, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/026,767

(22) Filed: Sep. 13, 2013

(65) Prior Publication Data
US 2014/0013092 A1     Jan. 9, 2014

Related U.S. Application Data

(63) Continuation of application No. 13/118,876, filed on May 31, 2011, now Pat. No. 8,560,819.

(51) Int. Cl.
G06F 9/44     (2006.01)
G06F 9/24     (2006.01)
G06F 11/36    (2006.01)
G06F 9/445    (2006.01)

(52) U.S. Cl.
CPC .. *G06F 9/44* (2013.01); *G06F 9/24* (2013.01); *G06F 11/3664* (2013.01); *G06F 9/44505* (2013.01)

(58) Field of Classification Search
CPC ......... G06F 9/44; G06F 9/24; G06F 11/3664; G06F 9/44505
USPC ................... 713/1, 2, 100; 709/220; 717/171; 719/331
See application file for complete search history.

(56) References Cited

U.S. PATENT DOCUMENTS

| | | |
|---|---|---|
| 5,797,128 A | 8/1998 | Birnbaum |
| 5,889,953 A | 3/1999 | Thebaut et al. |
| 6,064,656 A | 5/2000 | Angal et al. |
| 6,167,445 A | 12/2000 | Gai et al. |
| 6,381,639 B1 | 4/2002 | Thebaut et al. |
| 6,516,416 B2 | 2/2003 | Gregg et al. |
| 6,578,076 B1 | 6/2003 | Putzolu |

(Continued)

OTHER PUBLICATIONS

U.S. Appl. No. 13/118,876, Notice of Allowance mailed on Jun. 12, 2013, 9 pages.

(Continued)

*Primary Examiner* — M Elamin
(74) *Attorney, Agent, or Firm* — Kilpatrick Townsend & Stockton LLP

(57) ABSTRACT

Arrangements for executing enterprise resource planning software in a plurality of modes are presented. A graphical user interface may allow an administrator to select from the plurality of modes for executing the enterprise resource planning software, such as a test mode and a production mode. A selection of one of the modes may be received. The selected mode may be linked with a particular initialization file that is used to initialize the enterprise resource software. The enterprise resource planning software may be initialized and run using the selected initialization file.

20 Claims, 7 Drawing Sheets

(56) References Cited

U.S. PATENT DOCUMENTS

| | | | |
|---|---|---|---|
| 6,944,183 B1 | 9/2005 | Iyer et al. | |
| 6,952,728 B1 | 10/2005 | Alles et al. | |
| 7,197,741 B1* | 3/2007 | Stapf | 717/113 |
| 7,213,068 B1 | 5/2007 | Kohli et al. | |
| 7,290,288 B2 | 10/2007 | Gregg et al. | |
| 7,350,204 B2 | 3/2008 | Lambert et al. | |
| 7,424,702 B1* | 9/2008 | Vinodkrishnan et al. | 717/124 |
| 7,444,643 B2* | 10/2008 | Lo et al. | 719/311 |
| 7,478,419 B2 | 1/2009 | Anderson et al. | |
| 7,543,276 B2* | 6/2009 | Pfander et al. | 717/125 |
| 7,607,164 B2 | 10/2009 | Vasishth et al. | |
| 7,725,605 B2 | 5/2010 | Palmeri et al. | |
| 7,796,760 B2 | 9/2010 | Brettle et al. | |
| 7,855,972 B2 | 12/2010 | Pettit et al. | |
| 7,877,264 B2 | 1/2011 | Fox et al. | |
| 8,005,930 B2* | 8/2011 | Abeln et al. | 709/220 |
| 8,104,080 B2 | 1/2012 | Burns et al. | |
| 8,145,784 B2 | 3/2012 | See et al. | |
| 8,156,538 B2 | 4/2012 | Kanade et al. | |
| 8,265,969 B2 | 9/2012 | Comstock et al. | |
| 8,307,413 B2 | 11/2012 | Smadja et al. | |
| 8,417,709 B2 | 4/2013 | Chiticariu et al. | |
| 8,448,216 B2 | 5/2013 | Liu et al. | |
| 8,484,693 B2 | 7/2013 | Cox et al. | |
| 8,560,819 B2* | 10/2013 | Fillipi et al. | 713/1 |
| 8,635,682 B2 | 1/2014 | Kavantzas et al. | |
| 8,650,250 B2 | 2/2014 | Yamuna et al. | |
| 8,650,288 B2 | 2/2014 | Yamuna et al. | |
| 8,726,349 B2 | 5/2014 | Kavantzas et al. | |
| 8,875,306 B2 | 10/2014 | Lowes | |
| 8,914,843 B2 | 12/2014 | Bryan et al. | |
| 8,973,117 B2 | 3/2015 | Kavantzas et al. | |
| 9,003,478 B2 | 4/2015 | Kavantzas et al. | |
| 9,021,055 B2 | 4/2015 | Kavantzas et al. | |
| 9,043,864 B2 | 5/2015 | Kavantzas et al. | |
| 9,055,068 B2 | 6/2015 | Bryan et al. | |
| 9,088,571 B2 | 7/2015 | Bryan et al. | |
| 9,143,511 B2 | 9/2015 | Bryan et al. | |
| 2002/0124067 A1 | 9/2002 | Parupudi et al. | |
| 2002/0143914 A1 | 10/2002 | Cihula et al. | |
| 2002/0184525 A1 | 12/2002 | Cheng | |
| 2003/0023587 A1 | 1/2003 | Dennis et al. | |
| 2003/0115179 A1 | 6/2003 | Prabakaran et al. | |
| 2003/0115484 A1 | 6/2003 | Moriconi et al. | |
| 2003/0229501 A1 | 12/2003 | Copeland et al. | |
| 2004/0015487 A1 | 1/2004 | Lin et al. | |
| 2004/0015488 A1 | 1/2004 | Anonsen et al. | |
| 2004/0039594 A1 | 2/2004 | Narasimhan et al. | |
| 2004/0042470 A1 | 3/2004 | Cooper et al. | |
| 2004/0103046 A1* | 5/2004 | Christoph et al. | 705/28 |
| 2004/0177139 A1 | 9/2004 | Schuba et al. | |
| 2004/0181775 A1 | 9/2004 | Anonsen et al. | |
| 2004/0189708 A1 | 9/2004 | Larcheveque et al. | |
| 2005/0038790 A1 | 2/2005 | Wolthusen | |
| 2005/0080914 A1 | 4/2005 | Lerner et al. | |
| 2005/0086197 A1 | 4/2005 | Boubez et al. | |
| 2005/0091352 A1 | 4/2005 | Alex et al. | |
| 2005/0114243 A1 | 5/2005 | Scumniotales et al. | |
| 2005/0223109 A1 | 10/2005 | Mamou et al. | |
| 2006/0041565 A1 | 2/2006 | Cuomo et al. | |
| 2006/0053120 A1 | 3/2006 | Shum et al. | |
| 2006/0075465 A1 | 4/2006 | Ramanathan et al. | |
| 2006/0088276 A1 | 4/2006 | Cho et al. | |
| 2006/0089938 A1 | 4/2006 | Leonard et al. | |
| 2006/0117063 A1 | 6/2006 | Havewala et al. | |
| 2006/0206440 A1 | 9/2006 | Anderson et al. | |
| 2006/0230430 A1 | 10/2006 | Hondo et al. | |
| 2006/0282876 A1 | 12/2006 | Shelest et al. | |
| 2007/0006278 A1 | 1/2007 | Ioan Avram et al. | |
| 2007/0157287 A1 | 7/2007 | Lim | |
| 2007/0204324 A1 | 8/2007 | Roberts et al. | |
| 2007/0266032 A1 | 11/2007 | Blumenau | |
| 2007/0266422 A1 | 11/2007 | Germano et al. | |
| 2007/0282879 A1 | 12/2007 | Degenkolb et al. | |
| 2008/0040364 A1 | 2/2008 | Li | |
| 2008/0046961 A1 | 2/2008 | Pouliot | |
| 2008/0065466 A1 | 3/2008 | Liu et al. | |
| 2008/0066189 A1 | 3/2008 | Liu et al. | |
| 2008/0071805 A1 | 3/2008 | Mourra et al. | |
| 2008/0091682 A1 | 4/2008 | Lim | |
| 2008/0098453 A1 | 4/2008 | Hinton et al. | |
| 2008/0148345 A1 | 6/2008 | Rubio | |
| 2008/0155641 A1 | 6/2008 | Beavin et al. | |
| 2008/0184201 A1 | 7/2008 | Burns et al. | |
| 2008/0189760 A1 | 8/2008 | Rosenberg et al. | |
| 2008/0225748 A1 | 9/2008 | Khemani et al. | |
| 2008/0229381 A1 | 9/2008 | Sikka et al. | |
| 2008/0244692 A1 | 10/2008 | Chang | |
| 2008/0244693 A1 | 10/2008 | Chang | |
| 2008/0256593 A1 | 10/2008 | Vinberg et al. | |
| 2008/0288651 A1 | 11/2008 | Brauel et al. | |
| 2008/0301757 A1 | 12/2008 | Demarest et al. | |
| 2008/0320550 A1 | 12/2008 | Strassner et al. | |
| 2009/0049518 A1 | 2/2009 | Roman et al. | |
| 2009/0070853 A1 | 3/2009 | Chung et al. | |
| 2009/0099860 A1 | 4/2009 | Karabulut et al. | |
| 2009/0099882 A1 | 4/2009 | Karabulut | |
| 2009/0106816 A1 | 4/2009 | Ito | |
| 2009/0125612 A1 | 5/2009 | Rabetge et al. | |
| 2009/0150824 A1 | 6/2009 | Furuichi | |
| 2009/0177929 A1 | 7/2009 | Sijelmassi | |
| 2009/0193057 A1 | 7/2009 | Maes | |
| 2009/0205013 A1 | 8/2009 | Lowes | |
| 2009/0281996 A1 | 11/2009 | Liu et al. | |
| 2010/0030890 A1 | 2/2010 | Dutta et al. | |
| 2010/0064184 A1 | 3/2010 | Almeida et al. | |
| 2010/0077455 A1 | 3/2010 | Nishio et al. | |
| 2010/0100810 A1 | 4/2010 | Nakamura et al. | |
| 2010/0115075 A1 | 5/2010 | Chen et al. | |
| 2010/0125477 A1 | 5/2010 | Mousseau et al. | |
| 2010/0125665 A1 | 5/2010 | Simpson et al. | |
| 2010/0153695 A1 | 6/2010 | Bussard et al. | |
| 2010/0175105 A1 | 7/2010 | Vasishth et al. | |
| 2010/0217853 A1 | 8/2010 | Alexander et al. | |
| 2010/0235915 A1 | 9/2010 | Memon et al. | |
| 2010/0269148 A1 | 10/2010 | Almeida et al. | |
| 2010/0281455 A1 | 11/2010 | Anand et al. | |
| 2010/0281516 A1 | 11/2010 | Lerner et al. | |
| 2011/0035650 A1 | 2/2011 | Jardine-Skinner et al. | |
| 2011/0047451 A1 | 2/2011 | Jardine-Skinner et al. | |
| 2011/0131275 A1 | 6/2011 | Maida-Smith et al. | |
| 2011/0302239 A1 | 12/2011 | Grateau et al. | |
| 2011/0321122 A1 | 12/2011 | Mwangi et al. | |
| 2012/0054163 A1 | 3/2012 | Liu et al. | |
| 2012/0054496 A1* | 3/2012 | Abeln et al. | 713/176 |
| 2012/0093031 A1 | 4/2012 | Wang et al. | |
| 2012/0102182 A1 | 4/2012 | Voskuil et al. | |
| 2012/0110093 A1 | 5/2012 | Tingstrom et al. | |
| 2012/0131091 A1 | 5/2012 | Yamuna et al. | |
| 2012/0131134 A1 | 5/2012 | De Foy et al. | |
| 2012/0131135 A1 | 5/2012 | Yamuna et al. | |
| 2012/0131164 A1 | 5/2012 | Bryan et al. | |
| 2012/0131469 A1 | 5/2012 | Yamuna et al. | |
| 2012/0131641 A1 | 5/2012 | Kavantzas et al. | |
| 2012/0131654 A1 | 5/2012 | Kavantzas et al. | |
| 2012/0216100 A1 | 8/2012 | Jardine-Skinner et al. | |
| 2012/0311309 A1 | 12/2012 | Fillipi et al. | |
| 2012/0311658 A1 | 12/2012 | Dozier | |
| 2013/0086184 A1 | 4/2013 | Kavantzas et al. | |
| 2013/0086240 A1 | 4/2013 | Bryan et al. | |
| 2013/0086241 A1 | 4/2013 | Bryan et al. | |
| 2013/0086242 A1 | 4/2013 | Bryan et al. | |
| 2013/0086626 A1 | 4/2013 | Kavantzas et al. | |
| 2013/0086627 A1 | 4/2013 | Bryan et al. | |
| 2013/0262646 A1 | 10/2013 | Fiebig et al. | |
| 2013/0347062 A1 | 12/2013 | Matityahu et al. | |
| 2014/0096188 A1 | 4/2014 | Mont et al. | |
| 2014/0109195 A1 | 4/2014 | Kavantzas et al. | |
| 2014/0129706 A1 | 5/2014 | Yamuna et al. | |
| 2014/0179271 A1 | 6/2014 | Guccione et al. | |

OTHER PUBLICATIONS

U.S. Appl. No. 13/118,940, Final Office Action mailed on Aug. 29, 2013, 10 pages.

(56) References Cited

OTHER PUBLICATIONS

U.S. Appl. No. 13/118,940, Non-Final Office Action mailed on Feb. 13, 2013, 9 pages.
U.S. Appl. No. 13/118,940, Notice of Allowance mailed on Jan. 15, 2014, 5 pages.
U.S. Appl. No. 13/118,944 Corrected Notice of Allowance mailed on Dec. 16, 2013, 5 pages.
U.S. Appl. No. 13/118,944, Non Final Office Action mailed on May 16, 2013, 31 pages.
U.S. Appl. No. 13/118,944, Notice of Allowance mailed on Oct. 10, 2013, 10 pages.
U.S. Appl. No. 13/149,037, Non-Final Office Action mailed on May 1, 2013, 9 pages.
U.S. Appl. No. 13/149,037, Notice of Allowance mailed on Oct. 8, 2013, 7 pages.
U.S. Appl. No. 13/149,049, Non-Final Office Action mailed on Mar. 5, 2013, 15 pages.
U.S. Appl. No. 13/149,049, Notice of Allowance mailed on Sep. 17, 2013, 10 pages.
U.S. Appl. No. 13/149,065, Final Office Action mailed on Jul. 3, 2013, 21 pages.
U.S. Appl. No. 13/149,065, Non-Final Office Action mailed on Dec. 4, 2012, 30 pages.
U.S. Appl. No. 13/436,933, Non-Final Office Action mailed on Feb. 20, 2014, 25 pages.
U.S. Appl. No. 13/436,940, Final Office Action mailed on Jan. 28, 2014, 22 pages.
U.S. Appl. No. 13/436,940, Non-Final Office Action mailed on Jul. 15, 2013, 31 pages.
Bajaj et al., Web Services Policy Framework (WS-Policy), BEA systems Inc. et al. version 1.2, Mar. 2006, 25 pages.
Christensen et al., Web Services Description Language (WSDL), World Wide Web Consortium. version 1.1, Mar. 2001, 53 pages.
Nordbotten, N.A., XML and Web Services Security Standards, Communications Surveys & Tutorials, IEEE, vol. 11, No. 3, Oct. 3, 2009, 18 pages.
Phan et al., Quality-Driven Business Policy Specification and Refinement for Service-Oriented Systems, Springer-Verlag Berlin Heidelberg, 2008, 17 pages.
Shute et al., DataPower SOA Appliance Service Planning, Implementation, and Best Practices, IBM Redbook, Jun. 28, 2011, 162 pages.
U.S. Appl. No. 13/118,947, Non-Final Office Action mailed on Jun. 20, 2014, 31 pages.
U.S. Appl. No. 13/436,940, Advisory Action mailed on Apr. 22, 2014, 3 pages.
U.S. Appl. No. 13/596,525, Non Final Office Action mailed on May 30, 2014, 15 pages.
U.S. Appl. No. 13/596,861, Non-Final Office Action mailed on Apr. 10, 2014, 29 pages.
U.S. Appl. No. 13/596,891, Non-Final Office Action mailed on Apr. 25, 2014, 10 pages.
U.S. Appl. No. 13/149,065, Non-Final Office Action mailed on Jul. 14, 2014, 23 pages.
U.S. Appl. No. 13/436,933, Final Office Action mailed on Aug. 29, 2014, 28 pages.
U.S. Appl. No. 13/436,940, Notice of Allowance mailed on Aug. 12, 2014, 13 pages.
U.S. Appl. No. 13/596,545, Non-Final Office Action mailed on Aug. 4, 2014, 27 pages.
U.S. Appl. No. 14/106,037, Non-Final Office Action mailed on Jul. 16, 2014, 16 pages.
U.S. Appl. No. 13/596,891, Final Office Action mailed on Oct. 2, 2014, 11 pages.
U.S. Appl. No. 13/596,861, Final Office Action mailed on Oct. 3, 2014, 30 pages.
Ion et al., Extending the Java Virtual Machine to Enforce Fine-Grained Security Policies in Mobile Devices, Dec. 2007, Twenty-Third Annual Computer Security Applications Corference, pp. 233-242.
Montanari et al., "Policy-based Separation of Concerns for Dynamic Code Mobility Management," Proceedings of the 27th Annual International Computer Software and Applications Conference, pp. 82-90 (Nov. 2003).
Schuba, et al., "Scaling Network Services Using Programmable Network Devices," IEEE Computer Society, col. 38, No. 4, Apr. 2005, pp. 52-60.
Final Office Action for U.S. Appl. No. 13/596,525 (Nov. 26, 2014), 15 pages.
Notice of Allowance for U.S. Appl. No. 13/149,065 (Dec. 29, 2014), 10 pages.
Final Office Action for U.S. Appl. No. 13/118,947 (Jan. 15, 2015), 32 pages.
Notice of Allowance for U.S. Appl. No. 13/596,891 (Feb. 2, 2015), 5 pages.
Notice of Allowance for U.S. Appl. No. 13/436,933 (Jan. 21, 2015), 21 pages.
Notice of Allowance for U.S. Appl. No. 13/596,861 (Mar. 13, 2015), 22 pages.
Notice of Allowance for U.S. Appl. No. 13/596,525 (Mar. 13, 2015), 12 pages.
Non-Final Office Action for U.S. Appl. No. 13/118,947 (Jul. 31, 2015), 37 pages.

* cited by examiner

SOFTWARE EXECUTION USING MULTIPLE INITIALIZATION MODES

CROSS-REFERENCES

This application is a continuation of U.S. patent application Ser. No. 13/118,876 filed May 31, 2011, titled "SOFTWARE EXECUTION USING MULTIPLE INITIALIZATION MODES," Now U.S. Pat. No. 8,560,819 which is hereby incorporated by reference, as if set forth in full in this document, for all purposes.

BACKGROUND

Software, such as enterprise resource planning (ERP) systems, may have various properties that are controlled by an initialization file (e.g., an .ini file). For example, ERP software may have a large number of configurable attributes that allow for flexibility to accommodate the needs of various customers (e.g., a corporation or other business entity). When the ERP software is executed, these attributes may, at least in part, define how the ERP software is executed. Administrators that are configuring ERP software on behalf of a customer may not initially desire the ERP software to execute as it will when executed for use by end users. Rather, administrators may desire a particular configuration of the ERP software for testing. Typically, to test the ERP software, the administrator may manually edit attributes of one or more initialization files of the ERP software, such as by using a text editor to view and modify the contents of the initialization file. Such manual editing of parameters in an initialization file may be a time-consuming process and have a likelihood for introducing errors to the initialization file.

SUMMARY

In some embodiments, a method for executing enterprise resource planning software in a plurality of modes is presented. The method may include presenting, by a computer system, a graphical user interface to select from the plurality of modes for executing the enterprise resource planning software. The plurality of modes may comprise a test mode and a production mode. The method may include receiving, by the computer system, via the graphical user interface, a first selection of the test mode, wherein the test mode may be linked with a test initialization file. The test initialization file may be configured to: initialize the enterprise resource software for a fewer number of users than the production mode; initialize a set of processes to be run; and initialize a fewer number of processes than the production mode is configured to initialize. The method may include initializing, by the computer system, the enterprise resource planning software using the test initialization file. The method may include executing, by the computer system, the enterprise resource planning software as initialized using the test initialization file. The method may include receiving, by the computer system, via the graphical user interface, a second selection of the production mode. The production mode may be linked with a production initialization file. The production initialization file may be configured to: initialize the enterprise resource software for a greater number of users than the test mode; initialize the set of processes to be run; and initialize a greater number of processes than the test mode is configured to initialize. The method may include initializing, by the computer system, the enterprise resource planning software using the production initialization file. The method may include executing, by the computer system, the enterprise resource planning software as initialized by the production initialization file.

In some embodiments, receiving, by the computer system, via the graphical user interface, the selection of the test mode comprises the user providing a single input for selection of the test mode. In some embodiments the method further comprises generating, by the computer system, the test initialization file at least partially based on the production initialization file, wherein generation of the test initialization file follows a set of predefined initialization file generation rules. In some embodiments, the test initialization file is further configured to initialize a fewer number of network processes and kernel processes than the production mode is configured to initialize. In some embodiments, the method further comprises receiving, by the computer system, text-based modifications to contents of the test initialization file. Presenting, by the computer system, the user with the graphical user interface to select from the plurality of modes for executing enterprise resource planning software may further comprise a maintenance mode, wherein the maintenance mode is linked with a maintenance initialization file. The maintenance initialization file may be configured to: prevent access to the enterprise resource software for a plurality of users; initialize only a subset of processes from the set of processes to be run; and initialize a fewer number of processes than the production mode is configured to initialize. In some embodiments, the method further includes receiving, by the computer system, via the graphical user interface, a third selection of the maintenance mode; initializing, by the computer system, the enterprise resource planning software using the maintenance initialization file; and executing, by the computer system, the enterprise resource planning software as initialized by the maintenance initialization file.

In some embodiments, a computer program product residing on a non-transitory processor-readable medium is presented. The non-transitory processor-readable medium may comprise processor-readable instructions configured to cause a processor to present a graphical user interface to select from the plurality of modes for executing software. The plurality of modes may comprise: a first mode; and a second mode. The non-transitory processor-readable medium may comprise processor-readable instructions configured to receive via the graphical user interface, a first selection of the first mode. The first mode may be linked with a first initialization file. The first initialization file may be configured to: initialize the software for a fewer number of users than the second mode; initialize a set of processes to be run; and initialize a fewer number of processes than the second mode is configured to initialize. The non-transitory processor-readable medium may comprise processor-readable instructions configured to initialize the software using the first initialization file. The non-transitory processor-readable medium may comprise processor-readable instructions configured to execute the software as initialized using the first initialization file. The non-transitory processor-readable medium may comprise processor-readable instructions configured to receive, via the graphical user interface, a second selection of the second mode. The second mode may be linked with a second initialization file. The second initialization file may be configured to: initialize the software for a greater number of users than the first mode; initialize the set of processes to be run; and initialize a greater number of processes than the first mode is configured to initialize. The non-transitory processor-readable medium may comprise processor-readable instructions configured to initialize the software using the second initialization file. Also, the non-transitory processor-readable medium may comprise processor-readable instructions configured to execute the software as initialized by the second initialization file.

In some embodiments, a system for executing enterprise resource planning software in a plurality of modes. The system may include a processor; and a memory communicatively coupled with and readable by the processor and having stored therein a series of instructions. The instructions, when executed by the processor, cause the processor to: present a graphical user interface to select from the plurality of modes for executing software, wherein the plurality of modes comprises: a first mode; and a second mode. The instructions may also cause the processor to receive via the graphical user interface, a first selection of the first mode. The first mode may be linked with a first initialization file. The first initialization file may be configured to: initialize the software for a fewer number of users than the second mode; initialize a set of processes to be run; and initialize a fewer number of processes than the second mode is configured to initialize. The instructions may also cause the processor to initialize the software using the first initialization file. The instructions may also cause the processor to execute the software as initialized using the first initialization file. The instructions may also cause the processor to receive, via the graphical user interface, a second selection of the second mode. The second mode may be linked with a second initialization file. The second initialization file may be configured to: initialize the software for a greater number of users than the first mode; initialize the set of processes to be run; and initialize a greater number of processes than the first mode is configured to initialize. The instructions may also cause the processor to initialize the software using the second initialization file. Also, the instructions may also cause the processor to execute the software as initialized by the second initialization file.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
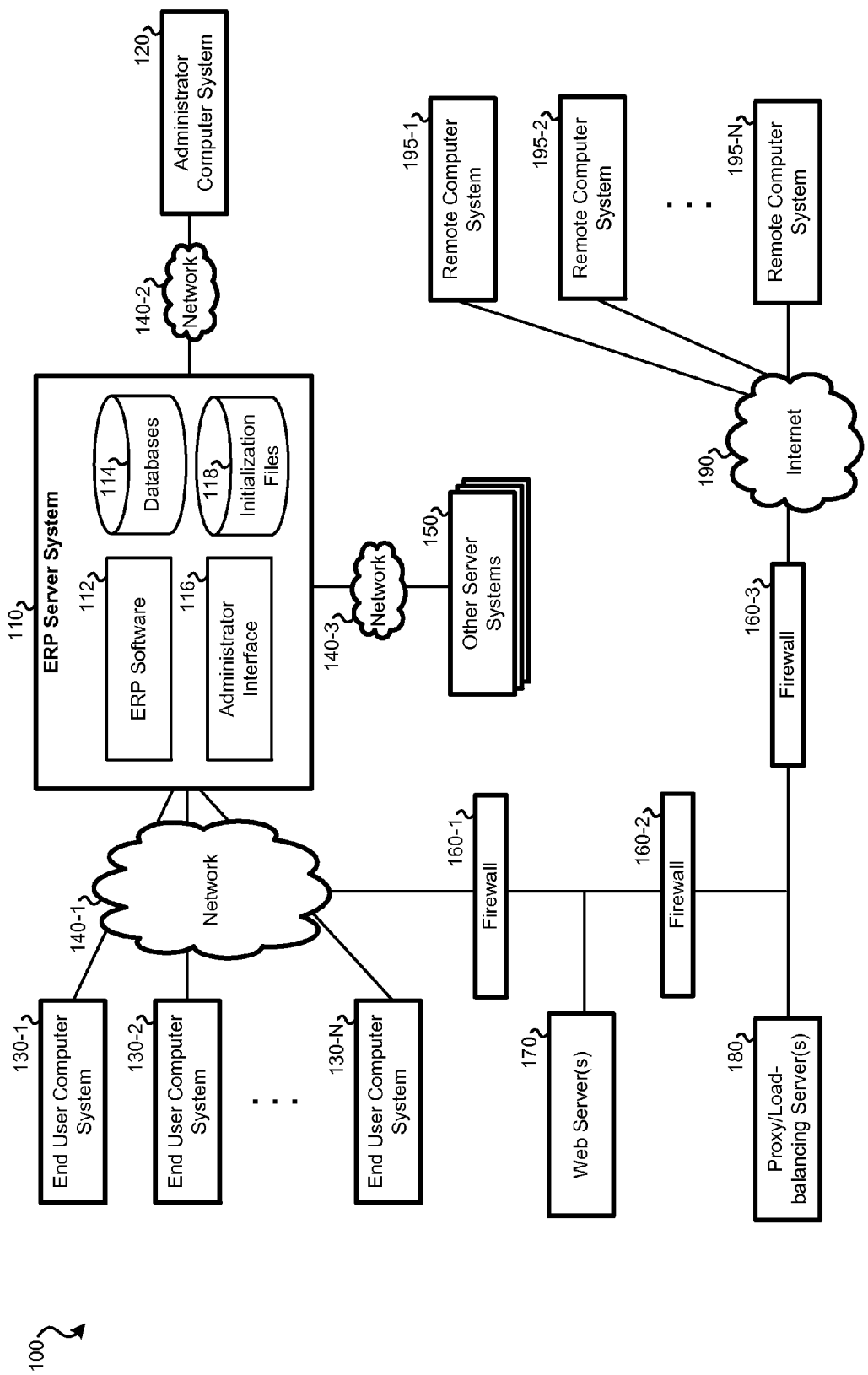
FIG. 1 illustrates an embodiment of an ERP system.

Rather than an administrator manually editing the attributes of an initialization file to test enterprise resource planning (ERP) software, an interface that allows the administrator to switch between multiple modes. Each mode may be linked with a separate initialization file, such as an .ini file. In some embodiments, a test mode and a production mode are present. The test mode may allow administrators to test the functionality of the ERP software with a reduced number of processes of the ERP software being executed. The production mode may allow the ERP software to "fully" run, such that it is functional to handle requests from multiple end users.

A standard test initialization file, created by the producer of the ERP software, may initially be linked with the test mode. This test initialization file may be customized by an administrator. For example, the standard test initialization file may contain parameters that are typically used in a test configuration of the ERP software. As necessary, the administrator can then edit this test initialization file to fit the administrator's specific needs. In some embodiments, the test initialization file is created at least partially based on the production initialization file. For example, after an administrator has created the production initialization file, the administrator may provide input to an interface indicating that a test initialization file is to be created based on the production initialization file. Based upon predefined rules, the test initialization file may be created based on the production initialization file.

In some embodiments, an administrator can define desired characteristics of a new mode. Based upon the defined characteristics, a new initialization file may be generated by an administrator interface based on the initialization file linked with production mode. For example, an administrator may desire to have a maintenance mode available for ERP software. In the maintenance mode, end users may be prevented from accessing the ERP system and the number of executed processes linked with the ERP system may be reduced. Such a maintenance mode may initiate only the components of the ERP system necessary for the administrator to perform maintenance on one or more ERP system or databases.

As such, an administrator can create and have access to multiple initialization files through a graphical user interface, such that an ERP system can be executed in multiple different modes. Rather than an administrator having to manually edit the initialization file each time a different mode of operating the ERP software is desired, the administrator can select between modes, with an appropriate initialization file linked with each mode being used to initialize the ERP system.

While the above description and below examples focus on ERP systems and software, it should be understood that similar principles can be applied to other systems and software. For example, more generically, an interface that allows an administrator (or some other form of user) to select between modes (and initialization files) may be used in conjunction with various other pieces of software that use one or more initialization files upon startup.

FIG. 1 illustrates an embodiment of an ERP system 100. ERP system 100 may include: ERP server system 110, administrator computer system 120, end user computer systems 130, networks 140, other server systems 150, firewalls 160, web server(s) 170, proxy and/or load-balancing servers 180 and remote computer systems 195. ERP server system 110 may include: ERP software 112, databases 114, administrator interface 116, and initialization files 118. ERP server system 110 may include one or more computer systems, such as computer system 700 of FIG. 7.

ERP software 112, which may be executed by ERP server system 110, may include one or more software packages for performing enterprise resource planning. For example ERP software 112 may be JD EDWARDS ENTERPRISEONE produced by ORACLE. ERP software 112 may include one or more processes that are executed on behalf of end users interacting with ERP software 112 via end user computer systems 130. These processes may include network processes and kernel processes. Network processes may handle the communication between ERP software 112 and other server systems 150, which may include one or more web application servers. Kernel processes may provide one or more services for end users. For example, kernel processes may handle: security validation, logic processing (also referred to as "call object" kernels), workflow and batch processing. The maximum number of each kernel type being executed at the same time and/or the number of each kernel type initialized when the ERP software is initialized may be configurable via an initialization file. The fewer number of kernels of the various kernel processes being initially executed by ERP Server system 110 will allow the ERP software 112 solution to start and stop more quickly while reducing the server's resource load.

ERP software 112 may interact with one or more databases 114. For example, databases 114 may include inventory databases, financial databases, etc. Administrator interface 116 may permit one or more administrators to modify how ERP software 112 functions. Administrator interface 116 may permit an administrator to select between one or more different modes. Each of these modes may be linked with one or more different initialization files. These initialization files may be stored as initialization files 118. If the ERP software 112 is JD EDWARDS ENTERPRISEONE, the initialization files may be different versions of a JDE.ini file. The JDE.ini file may be used to set various configurable attributes of JD EDWARDS ENTERPRISEONE ERP software. Of course, it should be understood that the name of the initialization file can vary depending on the software that the initialization file is linked with. Further, software, such as ERP Software 112, may be linked with multiple initialization files rather than just one initialization file. Further, initialization files may go by more than one name. For example, initialization files may also be referred to as configuration files (such as with a file extension of a .cfg).

ERP server system 110 may be in communication with one or more administrator computer systems, such as administrator computer system 120. Administrator computer system 120 may be a computer system remote from ERP server system 110 that permits one or more administrators to interact with ERP software 112. Administrator computer systems may be developer workstations. Administrator computer system 120 may be represented by computer system 700 of FIG. 7. In some embodiments, administrators may interact directly with ERP server system 110 (such as by using an input device of ERP server system 110). Administrators may modify the functionality of ERP software 112 via administrator interface 116. Administrator interface 116 may permit administrators the ability to change the mode ERP software 112 functions in. For example, each mode may be linked with a different initialization file of initialization files 118. If an administrator uses administrator interface 116 to select a different mode, the initialization file of initialization files 118 used to initiate ERP software 112 may be altered. Administrator computer system 120 may communicate with ERP server system 110 via network 140-2. Network 140-2 may be a public network, such as the Internet, a private network, such as a corporate local area network, or some combination thereof.

ERP server system 110 may be in communication with one or more end user computer systems 130. End user computer systems 130 may each be represented by computer system 700 of FIG. 7. End user computer systems 130 may be operated by end users that interact with ERP software 112. For example, end users may use an end user computer system, such as end user computer system 130-1, to interact with one or more of databases 114 via ERP software 112. End user computer systems 130 may communicate with ERP server system 110 via a local network, such as a switched Ethernet. While three end user computer system (130-1, 130-2, and 130-N) are illustrated in FIG. 1, it should be understood that a fewer or a greater number of end user computer systems may be in communication with ERP server system 110. In some embodiments, hundreds of end users may be concurrently interacting with ERP server system 110 and ERP software 112. End user computer systems 130 communicate with ERP server system 110 via network 140-1. Network 140-1 may represent the same or a different network from network 140-2.

Other server systems 150 may represent one or more server systems that are in communication with ERP server system 110. Some or all of other server systems 150 may communicate via network 140-3 with ERP server system 110. Other server systems 150 may include one or more deployment servers. Network 140-3 may represent the same network or a different network from network 140-2. Other server systems 150 may include a web application server.

Various other servers, web server(s) 170 may be in communication with ERP server system 110. Web server(s) 170, which may include one or more servers, may have a firewall between itself and ERP server system 110. Web server(s) 170 may include java applications servers (JAS) and/or HTML servers. Firewall 160-1 may be a class "C" firewall. Firewall 160-2 may be a class "B" firewall and may separate ERP server system 110 from one or more proxy and/or load balancing servers 180. Further, another firewall, firewall 160-3, which may be a class "A" firewall, may filter communication from one or more remote computer systems that are accessing ERP server system 110 via the Internet 190. Remote computer system 195-1 may represent a computer system of a user that is remotely accessing ERP server system 110 via the Internet 190. While three remote computer systems (195-1, 195-2, and 195-N are illustrated, greater or fewer remote computer systems may be in communication with ERP server system 110.

Figure 2:
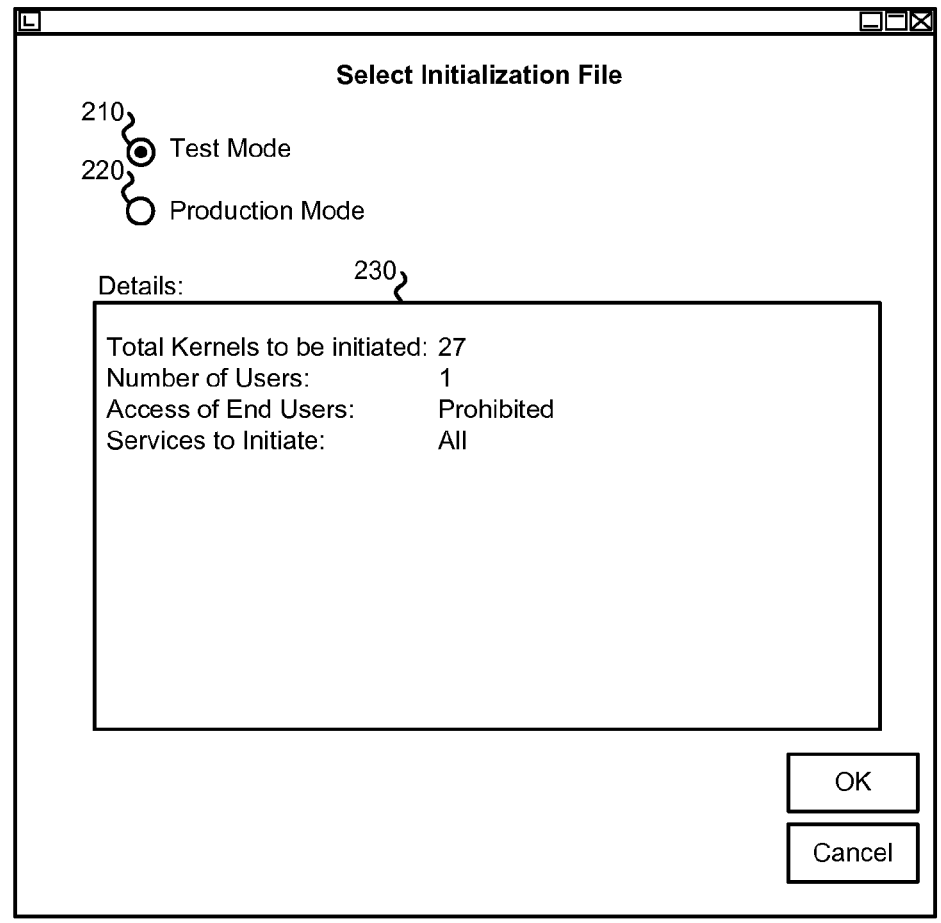
FIG. 2 illustrates an embodiment of an administrator interface window.

FIG. 2 illustrates an embodiment of an administrator interface window 200.

Administrator interface window 200 may represent an embodiment of administrator interface 116 of FIG. 1. For example, administrator interface window 200 may be a window of a graphical user interface that is presented to an administrator via administrator interface 116. Administrator interface window 200 may permit an administrator to select between multiple initialization modes for ERP software. In administrator interface window 200, the administrator has a choice between test mode 210 and production mode 220. Details window 230 may provide the administrator with details on the mode selected by the administrator.

Test mode 210 may be used, for example, for initial testing of ERP software or for testing updates to the ERP software. A smaller amount of computer resources may be necessary to execute ERP software in test mode 210 than in production mode 220. For example, test mode 210 may require a shorter time to initialize ERP software and/or may require a smaller amount of pre-allocated memory than production mode 220. Additionally, this may be advantageous when working to isolate a behavior anomaly or a product issue in the case where trace (debug) logging is enabled or increased. With the reduction in processes, the software log entries are reduced.

Test mode 210 may involve a smaller number of network processes and/or kernel processes being executed, as compared to an ERP system in production mode 220. In production mode, a network process may be running for approximately each one hundred concurrent end-users. Therefore, 1) a maximum number of instances of a particular type of process may be defined and 2) a number of instances that are to automatically start when the ERP software is initialized may be defined. Once the number of concurrent end users using the ERP system increases to a sufficient load (e.g., meets or exceeds the ratio for a process) additional instances of processes may be started, up to the maximum number of allowed instances. Each business running an ERP system may have different and unique business needs. For example, in some cases the test mode may be configured to start a single kernel for each available kernel type. The ERP software can then be run "through its paces" to certify it is working following any system changes, e.g. system/database tuning, maintenance patches, network updates, etc. In other cases, the test mode may be configured to start core kernels to provide specific minimal functionality for ERP HTML access. For instance, the Network, UBE, Security, Metadata, Management, Queue, and CallObject Kernels can be started while other kernels (Workflow, Scheduler, and Interoperability) can be disabled.

The test mode may permit running a slimmed-down configuration for product certification testing while reducing the server's process and resource footprint. This may allow for quicker shutdown and startup of ERP services in situations where changes have been made to an ERP or foundation system's configuration (tuning) or when maintenance patches have been applied to an ERP or related foundation system. The test mode may also prove useful when triaging an issue. In this case, the product or underlying foundation system's (database, operating system, web) logging levels may be increased. In this case, the test mode's configuration may include only single instantiations of core processes so as to reduce the number of logs and/or log entries to review following a test.

Some of the attributes that might be different for a test mode include: the number of database connections allowed, changing the network port to enable access to only the users designated to execute testing, changing the number of processes automatically started to meet the anticipated load (For troubleshooting an issue, the number of processes might be limited to a minimum number. For a load test the number of processes might be maximized.); utilizing a test database versus the production database; and/or modifying the number of Java Virtual Machines (JVMs) to start.

Referring to network processes, the maximum number of network processes and the number of network processes that automatically start when the ERP software is initialized may be defined within an initialization file. The maximum number of instances of network processes and the number of instances of network processes that start when the ERP software is initialized may be selected based on the recommendations of the producer of the ERP software. For example, the producer may recommend that ERP software should run an instance of a network process for each one hundred concurrent end-users and at least ten network processors. Increasing the number of network processes (such as one for every fifty concurrent end-users) may increase responsiveness of the ERP software to the end users. Conversely, decreasing the number of network processes (such as one for every two hundred concurrent end-users) may decrease responsiveness of the ERP software to the end users.

If the ERP software is to function in test mode, fewer instances of network processes that start when the ERP software is initialized may be needed in order to test the ERP software as compared to when the ERP software is to interact with end users in production mode. For example, if the ERP software would typically have ten network processes automatically initialize upon startup in production mode, in test mode, only one network process may be necessary to startup in order to sufficiently test the functionality of the ERP software by the administrator.

Test mode 210 may also have fewer instances of other processes automatically initiate when the ERP software is started as compared to when the ERP system functioning in production mode 220. In some embodiments, only one instance of each process is needed in test mode. In production mode, numerous instances of processes, such as kernel processes, may be executed by the ERP software based on a number of expected concurrent end users. For example, a producer of ERP software may recommend that for each ten concurrent end users, one logic kernel should be running on an ERP system. An administrator configuring an ERP system may use the producer's recommendations or may customize the ratio of kernels to concurrent end users as the administrator sees fit. Some number of each type of kernel may be selected to automatically initialize when the ERP software is started and a maximum number of instances of that type of kernel. Different kernels may be linked with 1) a number of instances of that kernel that automatically start upon initialization of the ERP software; and 2) a maximum number of instances of that kernel that can be concurrently executed. The initial and maximum number of instances of such kernels may be controlled via one or more initialization files.

As compared to production mode 220, test mode 210 may have fewer network processes and fewer kernel processes initiated. However, at least one instance of each type of service of the ERP software may be initiated. In some embodiments, test mode 210 may involve some processes (network or kernel) not having any instances initiated. The maximum number of network processes and kernel processes may also be reduced. Test mode 210 may be configured such that end users cannot access the ERP software.

Details window 230 may provide an administrator with details of the selected mode. For instance, referring to the example of FIG. 2, test mode 210 is currently selected. As such, details window 230 displays information on test mode 210. In this embodiment, the total number of kernels being executed upon initialization of the ERP software is 27. A total number of users (possibly only the administrator) that can access the ERP software may be displayed. In this embodiment of test mode 210, end users are prohibited. Also, all services that are present in production mode 220 are started in test mode 210.

Administrator interface window 200 of FIG. 2 is only intended to serve as an example. Similar information regarding modes and options for an administrator to select between various initialization modes for ERP software (or other forms of software) may be presented in a different format. Further, an interface to select between test mode 210 and production mode 220 may be presented as part of another interface to receive other input and/or provide other information to an administrator.

Figure 3:
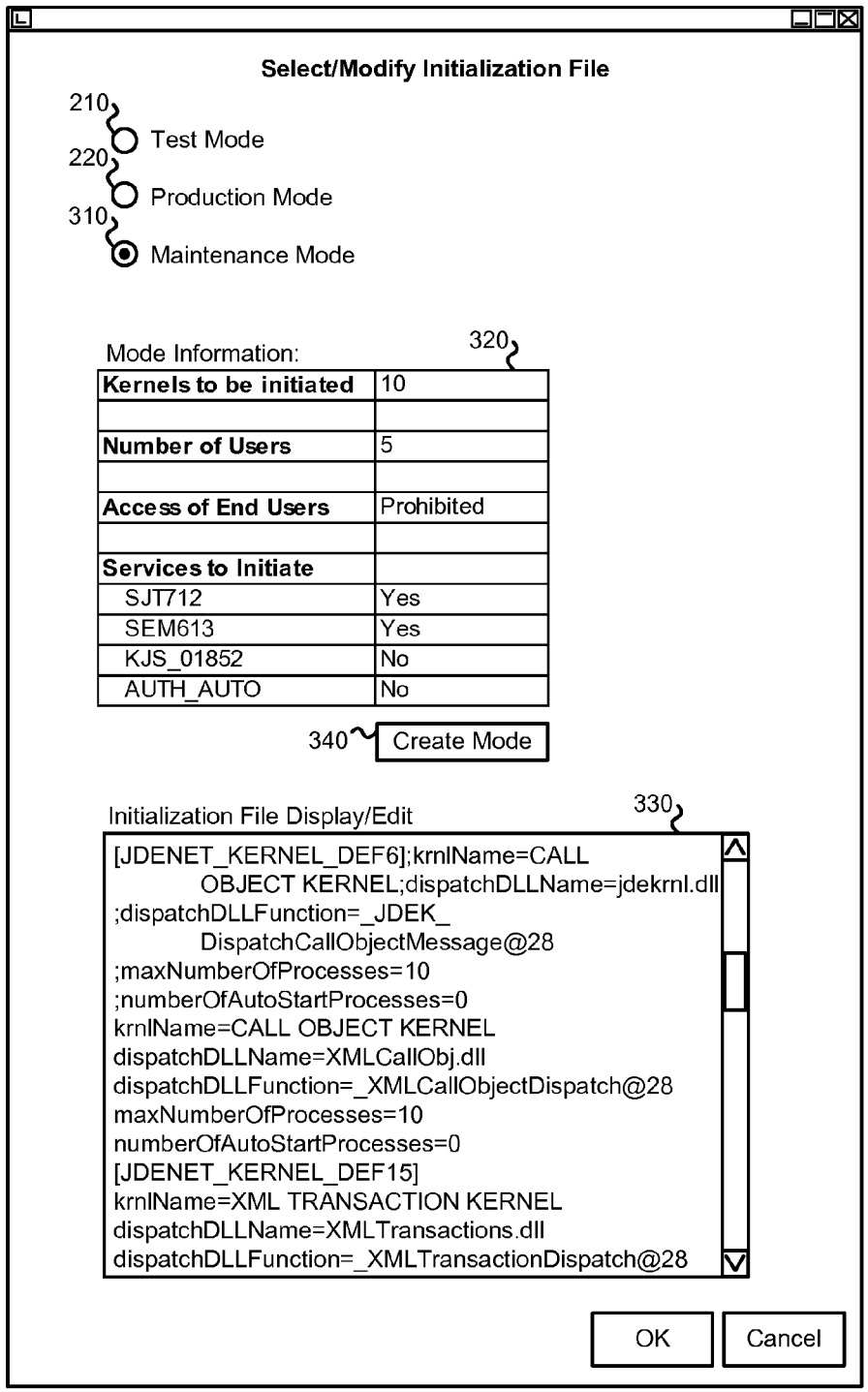
FIG. 3 illustrates another embodiment of an administrator interface window.

FIG. 3 illustrates another embodiment of an administrator interface window 300. Administrator interface window 300 may be part of administrator interface 116 of FIG. 1.

Administrator interface window 300 may permit an administrator to select between test mode 210 and production mode 220 as detailed in relation to administrator interface window 200 of FIG. 2. One or more additional modes may also be available to the administrator. For example, administrator interface window 300 provides an administrator with maintenance mode 310. Such a mode may be manually created by an administrator, may be provided with ERP software by the producer of the ERP software, or may be created by the administrator interface based on characteristics specified by the administrator.

An administrator may want a maintenance mode to allow the administrator to perform maintenance functions on one or more databases linked with the ERP software, such as databases 114 of FIG. 1. If the administrator is to manually create the initialization file linked with maintenance mode 310, initialization file display/edit window 330 may display the initialization file linked with production mode 220 for editing (to be used as a starting point). The administrator may then edit the initialization file such that the configurable attributes defined in the initialization file are set as the administrator desires for maintenance mode 310. Editing of the initialization file linked with maintenance mode 310 may include defining the number of network processes and/or kernel processes that are initialized when the ERP software initializes. Editing of the initialization file linked with maintenance mode 310 may also include modifications such that various processes are not initialized. For example, the maintenance mode may be intended for ERP software patches and code builds. In such a scenario, the Security and CallObject kernels may be disabled to prevent end users from logging into the system while the system is being maintained.

In some embodiments, the administrator may provide various mode information that defines characteristics of a mode that the administrator wishes to create. For example, if the administrator wishes to create maintenance mode 310, the administrator may provide various characteristics that maintenance mode 310 is to possess, such as via mode information display 320. In mode information display 320, the administrator may define characteristics, such as the maximum number of kernels that are to be initialized, the number of users that the ERP software should be configured to handle in the maintenance mode, whether or not access is permitted by end users to the ERP software, and/or which services (and their related processes) are to be initialized.

Following the administrator providing desired characteristics of a new mode in mode information display 320, the administrator may press the create mode button 340. The administrator interface may then use the characteristics provided by the administrator in mode information window 320 along with the initialization file that is associated with production mode 220 to create a new initialization file linked with maintenance mode 310 being created by the administrator. The information provided by the administrator in mode information window 320 may be used to modify various parameters present in the initialization file linked with production mode 220 to create an initialization file linked with maintenance mode 310. This new initialization file may be linked with the maintenance book. The administrator may have the opportunity to further edit the initialization file linked with maintenance mode 310 via an initialization file display/edit window 330. Following creation of the new mode (and associated initialization file), a new choice may be added to administrator interface window 300 such that the administrator may now select maintenance mode 310 in addition to the previously existing modes: test mode 210 and production mode 220.

As such, when maintenance mode 310 is selected by the administrator, the ERP software may be initiated using the initialization file linked with maintenance mode 310. Similarly, if test mode 210 is selected, the initialization file linked with test mode 210 may be used to initialize the ERP software. Similarly, if production mode 220 is selected, the initialization file linked with production mode 220 may be used to initialize the ERP software. While administrator interface window 300 illustrates three possible modes, it should be understood that additional modes may also be possible. For example, ERP software may be provided to customers with at least a certain number of predefined modes. ERP software linked with an administrator interface may be provided to administrators with a predefined test mode and production mode. These modes may be modified by the administrator. The administrator may also create additional modes to supplement and/or replace the predefined modes.

Administrator interface window 300 of FIG. 3 is only intended to serve as an example. Similar information regarding modes and options for an administrator to select between various initialization modes and files for ERP software may be presented in a different format. Further, an interface to select between various modes and edit initialization files may be presented as part of another interface to receive other input and/or provide other information to an administrator. Further, it should be understood that the sample text of the initialization file displayed in initialization file display/edit window 330 is for example purposes only and is not intended to represent parameters that necessarily should be present in a maintenance mode (or any other) initialization file.

Figure 4:
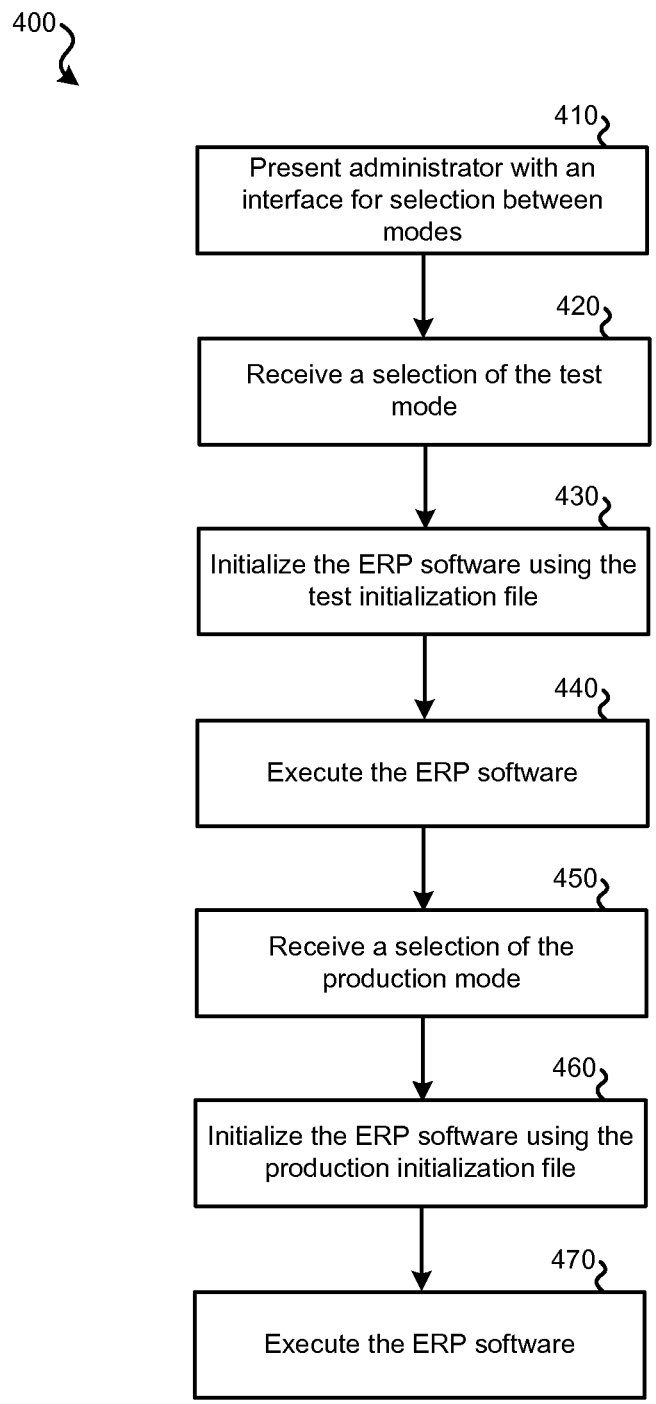
FIG. 4 illustrates an embodiment of a method for executing enterprise resource planning software in multiple modes.

The ERP system of FIG. 1, along with the various embodiments of an administrator interface detailed in relation to FIGS. 2 and 3, may be used in conjunction with various methods. FIG. 4 illustrates an embodiment of a method for executing enterprise resource planning software in multiple modes. Method 400 may be performed using ERP system 100 of FIG. 1 or some other form of ERP system. Also, an interface such as administrator interface windows 200 and 300 of FIGS. 2 and 3, respectively, may be used to perform method 400. Alternatively, other embodiments of administrator interfaces may be used to perform method 400.

At stage 410, an administrator, or other form of user, may be presented with an interface, such as administrator interface 116 of FIG. 1. The administrator interface, which may be a graphical user interface, may appear as illustrated in FIGS. 2 and 3, or may be a different embodiment of an administrator interface. The interface may allow the administrator to select between two or more different modes for ERP software to initialize in. Each mode available for selection by the administrator may be linked with one or more different initialization files. The initialization files (e.g., .ini files, .cfg files) may be text files that can be edited manually by the administrator using a text editor. In the illustrated embodiment of method 400, two of the modes present are a test mode and a production mode. Test mode may refer to a mode that allows an administrator to test the configuration of the ERP software. Production mode may refer to a mode that is configured for interaction with end users.

At stage 420, the administrator may select the test mode. As such, this selection may indicate that the administrator wishes to test the configuration of the ERP software. By selecting the test mode, the ERP software, when started, may be initialized using one or more test initialization files linked with the test mode. The test initialization file may indicate that a reduced number of instances, such as one instance, of various network and kernel processes are to be initiated. One or more processes may have no instances initialized. Also, end users may be prohibited from accessing the ERP software. Selecting a mode, such as the test mode, for initialization of ERP software may involve an administrator or other user only needing to provide one input, such as selecting a radio button or selecting a mode from a pull-down menu.

At stage 430, the ERP software may be initialized using the test initialization file. When the ERP software is triggered to initialize, the ERP software may access the selected test initialization file and configure itself in accordance with the attributes defined in the initialization file. As such the instances of processes initialized by the ERP software may be, at least in part, defined by the attributes within the initialization file. If a smaller number of processes are to be started (as compared to production mode), the ERP software may initialize faster and may require a smaller amount of memory.

At stage 440, the ERP software may be executed. The administrator may test the ERP software for as long as necessary. Once testing is complete, the administrator may shutdown the ERP software. This may involve termination of some or all of the processes linked with the ERP software. Following the execution of the ERP software in test mode, the administrator may now desire for the ERP software to be executed in production mode such that the ERP software is configured to handle requests from a volume of end users.

At stage 450, the administrator may, with the same interface presented at stage 410, select production mode. As such, this selection may indicate that the administrator wishes to execute the ERP software in production mode. By selecting production mode, the ERP software, when started, may be initialized using one or more production initialization files linked with the production mode. The one or more production initialization files may indicate various numbers of instances of network and kernel processes that are to be initiated. A greater number of instances of some or all of the processes may be permitted to be initialized when the load of end users reaches a threshold. In production mode, end users may be permitted to access the ERP software.

At stage 460, the ERP software may be initialized using the (one or more) production initialization files. When the ERP software is triggered to initialize, the ERP software may access the one or more production initialization files and configure itself in accordance with the attributes defined in the production initialization files. As such, the instances of processes initialized by the ERP software are defined by the attributes within the initialization file. The ERP software, in production mode, may consume more memory resources and take a longer time to initialize than in test mode.

At stage 470, the ERP software may be executed. The administrator may allow the ERP software to run in production mode for as long as needed, such as until updates, maintenance, or configuration changes are necessary. If, at some point, the ERP software needs to be initialized in test mode again, method 400 may return to stage 410.

While method 400 is illustrated as having an administrator select between a test mode and a production mode, a similar method may be used for an administrator, or other form of user, to select between other modes for initialization of software, such as ERP software. Further, while method 400 is shown as entering test mode followed by production mode, a similar method may be used to have the ERP software enter production mode followed by test mode.

Additionally, rather than having separate initialization files for test and production modes (and/or other modes), parameters within a single initialization file may be specified as linked with a particular mode. For example, referring to method 400, the administrator may still be permitted to select between different modes; however, rather than the modes being linked with different initialization files, each mode may be linked with particular attributes within the same initialization file that are only used if the corresponding mode is selected. As an example of this, two attributes within an initialization file may be:

"NumberOfProcesses=100" and
"TESTNumberOfProcess=1."

The "NumberOfProcesses=100" may define the number of processes in production mode, while "TESTNumberOfProcesses=1" defines the number of processes in test mode. As such, for each attribute linked with a particular mode, an initial value may be provided by the producer of the ERP software but may be editable by an administrator.

Figure 5:
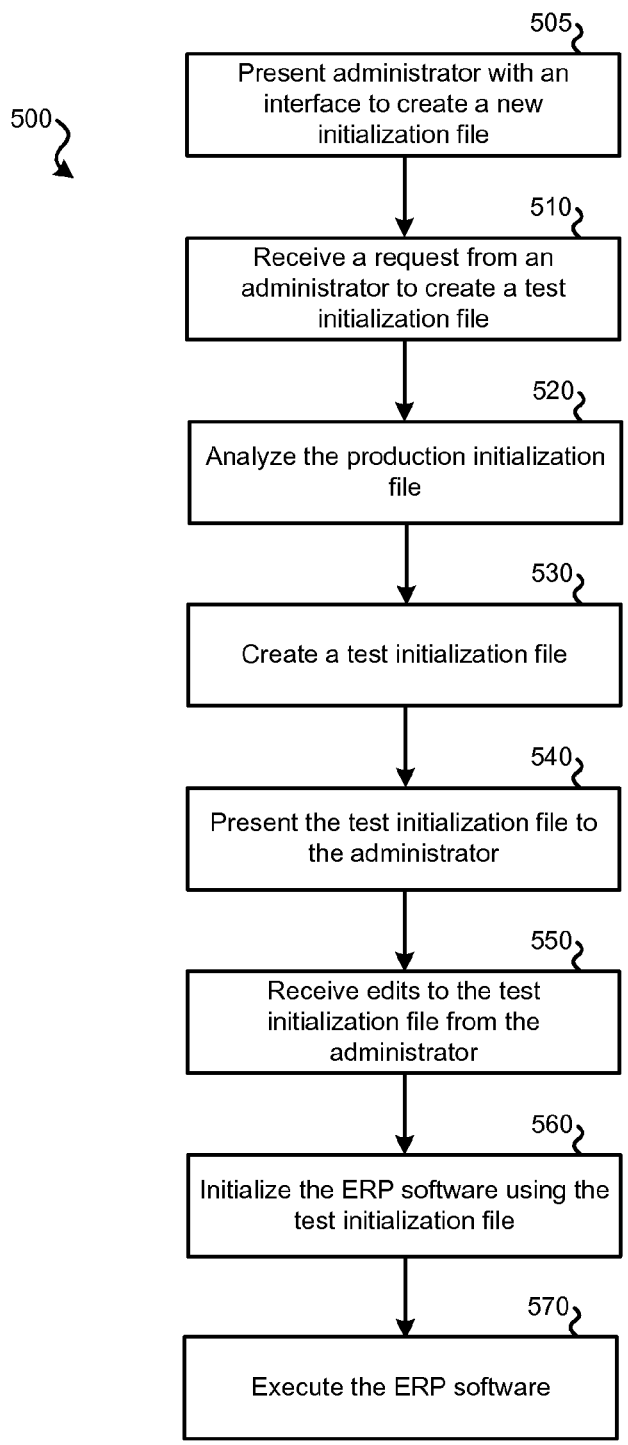
FIG. 5 illustrates an embodiment of a method for creating an initialization file and executing enterprise resource planning software using the initialization file.

FIG. 5 illustrates an embodiment of a method for creating an initialization file and executing enterprise resource planning software using the initialization file. Method 500 may be performed using ERP system 100 of FIG. 1 or some other form of ERP system. Also, an interface such as administrator interface window 300 of FIG. 3 may be used to perform method 500. Alternatively, other embodiments of administrator interfaces may be used to perform method 500.

At stage 505, an administrator, or other form of user, may be presented with an interface, such as administrator interface 116 of FIG. 1. The administrator interface, which may be a graphical user interface, may appear as illustrated in FIG. 3, or may be a different embodiment of an administrator interface. The interface may allow the administrator to select between two or more different modes for the ERP software to initialize in. The interface may also allow for the creation of new modes and associated initialization files. In the illustrated embodiment of method 500, the administrator is creating an initialization file for a test mode of ERP software. As such, before performing method 500, a test initialization file may not be available to the administrator or the previous test initialization file is obsolete. As such, an administrator interface may be used to create a new test initialization file. While method 500 is directed to the creation of a test initialization file, it should be understood that a similar method may be used to create a new initialization file for another mode of executing ERP software.

At stage 510, a request may be received from the administrator to create the test initialization file. For example, the administrator may provide an indication to the administrator interface that indicates that the administrator desires to create a test mode initialization file. At stage 520, the production initialization file may be analyzed. This analysis may be conducted by the ERP server system or by the administrator computer system. A set of predefined rules may be used to determine how the production initialization file may be modified to create a test initialization file. For example, a predefined rule may specify that only one network process needs to be initialized. As such, if the production initialization file indicates that ten network processes are initialized, it may be determined that this attribute of the production initialization file should be altered for the test initialization file. Other predefined rules may be used to identify processes that do not need to be initialized in a test initialization file. Still other predefined rules may identify kernel processes that only require one instance of the kernel to be initialized for the test mode.

At stage 530, based on the analysis of stage 520, a test mode initialization file may be created. This initialization file may be linked with a test mode, such that when the administrator selects to execute the ERP software in test mode, the test initialization file is used to initialize the ERP software. For instance, method 400 may be used to run the ERP software using the test initialization file.

At stage 540, the test initialization file may be presented to the administrator for editing. While the predefined rules may be used to create a functioning test mode initialization file from the production mode initialization file, the administrator may desire to make modifications. For example, the administrator may wish to prevent specific processes from initializing or to have multiple instantiations of certain processes initialize. The administrator may be able to view the initialization file through a window, such as initialization file display/edit window 330 of FIG. 3. Through such a window, or a separate editor, such as a text editor, edits to the test initialization file may be received from the administrator at stage 550.

At stage 560, the ERP software may be initialized using the test initialization file. When the ERP software is triggered to initialize, the ERP software may access the selected test initialization file and configure itself in accordance with the attributes defined in the initialization file. As such the instances of processes initialized by the ERP software are defined by the attributes within the initialization file. If a smaller number of processes are to be started (as compared to production mode), the ERP software may initialize faster and may require a smaller amount of dedicated memory.

At stage 570, the ERP software may be executed. The administrator may run the ERP software in test mode for as long as necessary. Once testing is complete, the administrator may shutdown the ERP software. This may involve termination of some or all of the processes linked with the ERP software.

While method 500 is illustrated as having an administrator create a test mode and associated test initialization file, a similar method may be used for an administrator, or other form of user, to create an initialization file linked with some other mode. For example, a different set of predefined rules (possibly supplied by the producer of the ERP software) may be used to create an initialization file linked with a maintenance mode.

Figure 6:
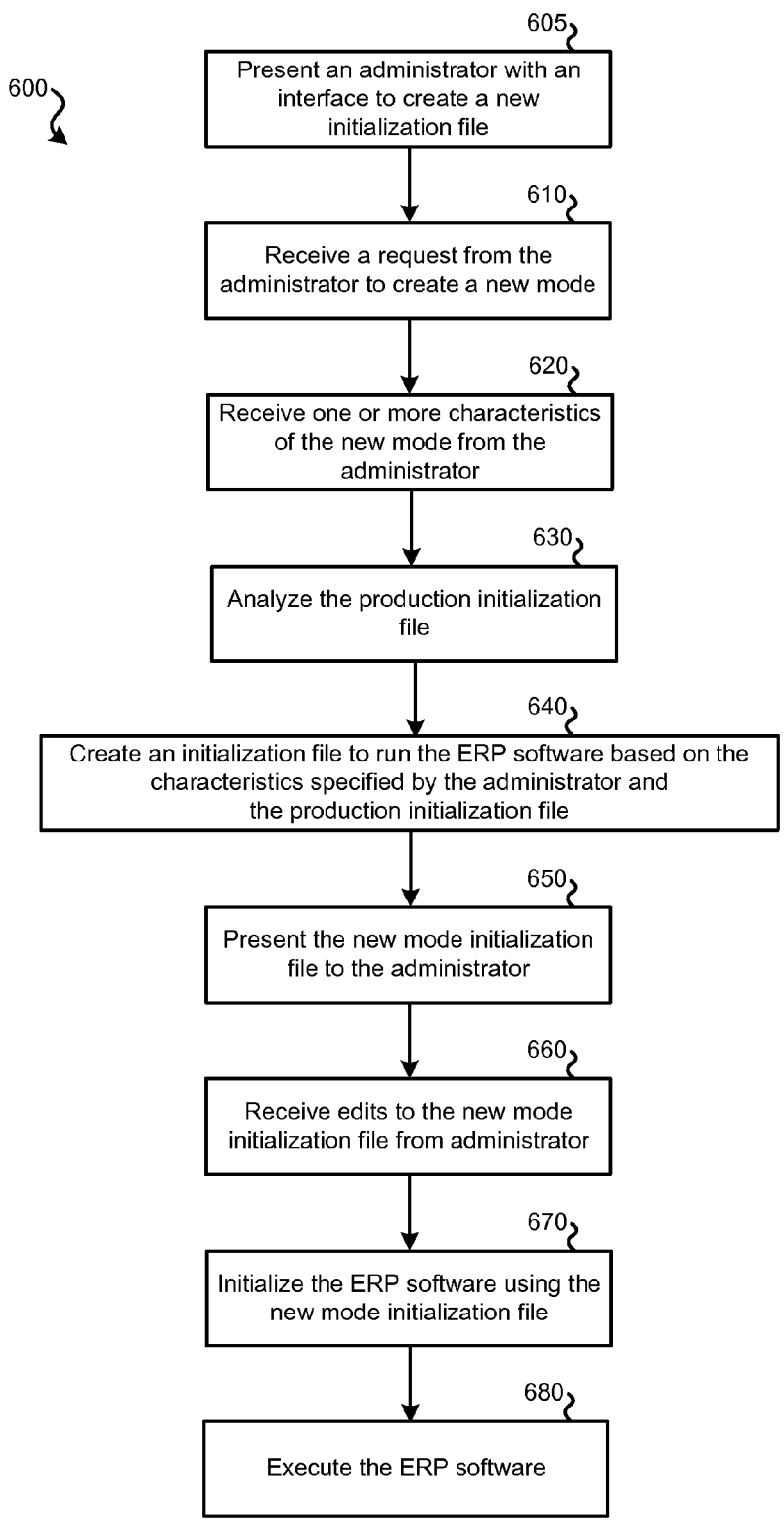
FIG. 6 illustrates an embodiment of another method for creating an initialization file and executing enterprise resource planning software using the initialization file.

FIG. 6 illustrates an embodiment of another method for creating an initialization file and executing enterprise resource planning software using the initialization file. In method 600, the administrator may define characteristics that are used to create the new initialization file from the production initialization file. At stage 605, an administrator, or other form of user, may be presented with an interface, such as administrator interface 116 of FIG. 1. The administrator interface, which may be a graphical user interface, may appear as illustrated in FIG. 3, or may be a different embodiment of an administrator interface. The interface may allow the administrator to select between modes for ERP software to initialize in. The interface may also allow for the creation of new modes and associated initialization files. In the illustrated embodiment of method 600, the administrator is creating an initialization file for a maintenance mode of ERP software. As such, before performing method 600, a maintenance initialization file may not be available to the administrator or the previous maintenance initialization file is obsolete. As such, an administrator interface may be used to create a maintenance initialization file. While method 600 is directed to the creation of a maintenance initialization file, it should be understood that a similar method may be used to create an initialization file for other modes of executing ERP software.

At stage 610, a request from the administrator to create a new mode and/or an associated initialization file may be received. The request may include a name of the new mode. At the same time as the request, before the request, or after the request, the administrator may provide various characteristics desired of the new mode at stage 620. For example, the administrator may define characteristics in a window, such as mode information window 320 of FIG. 3. The administrator may define characteristics such as: which services (e.g., processes) are to be initiated, the number of instantiations of each process, whether end users should have access to the ERP software, the number of users that the ERP software should be able to handle concurrently, the total number of kernels that are to be instantiated, the logging/trace levels the processes will run, the port in which the ERP services are bound, the user account/password used for the initial database connections, the intercommunication timeout and retry values, the build compiler flags and binary target folder locations, the environment and pathcodes used to initialize services, additional Java JVM arguments, etc. Some of the attributes that might be different for a maintenance mode include: restricting database access; restricting end-user access to the application; enabling administrator-only access; and/or enabling console-mode only access.

At stage 630, the production initialization file may be analyzed. This analysis may be conducted by the ERP server system or by the administrator computer system. At stage 640, an initialization file may be created to initialize the ERP software based on the characteristics specified by the administrator and the attributes present in the production initialization file. For example, attributes present in the production initialization file that are not affected by the characteristics provided by the administrator may be carried over from the production initialization file to the maintenance initialization file.

At stage 650, the maintenance initialization file may be presented to the administrator for reviewing and/or editing. The administrator may desire to make modifications to the created maintenance initialization file (beyond those made during the creation of the maintenance initialization file from the production initialization file. The administrator may be able to view the initialization file through a window, such as initialization file display/edit window 330 of FIG. 3. Through such a window, or a separate editor, such as a text editor, edits to the test initialization file may be received from the administrator at stage 660.

At stage 670, the ERP software may be initialized using the maintenance initialization file. When the ERP software is triggered to initialize, the ERP software may access the maintenance initialization file and configure itself in accordance with the attributes defined in the maintenance initialization file. As such the instances of processes initialized by the ERP software are defined by the attributes within the maintenance initialization file.

At stage 680, the ERP software may be executed. The administrator may operate the ERP software for as long as necessary in maintenance mode. Once maintenance is complete, the administrator may shutdown the ERP software. This may involve termination of some or all of the processes linked with the ERP software.

Figure 7:
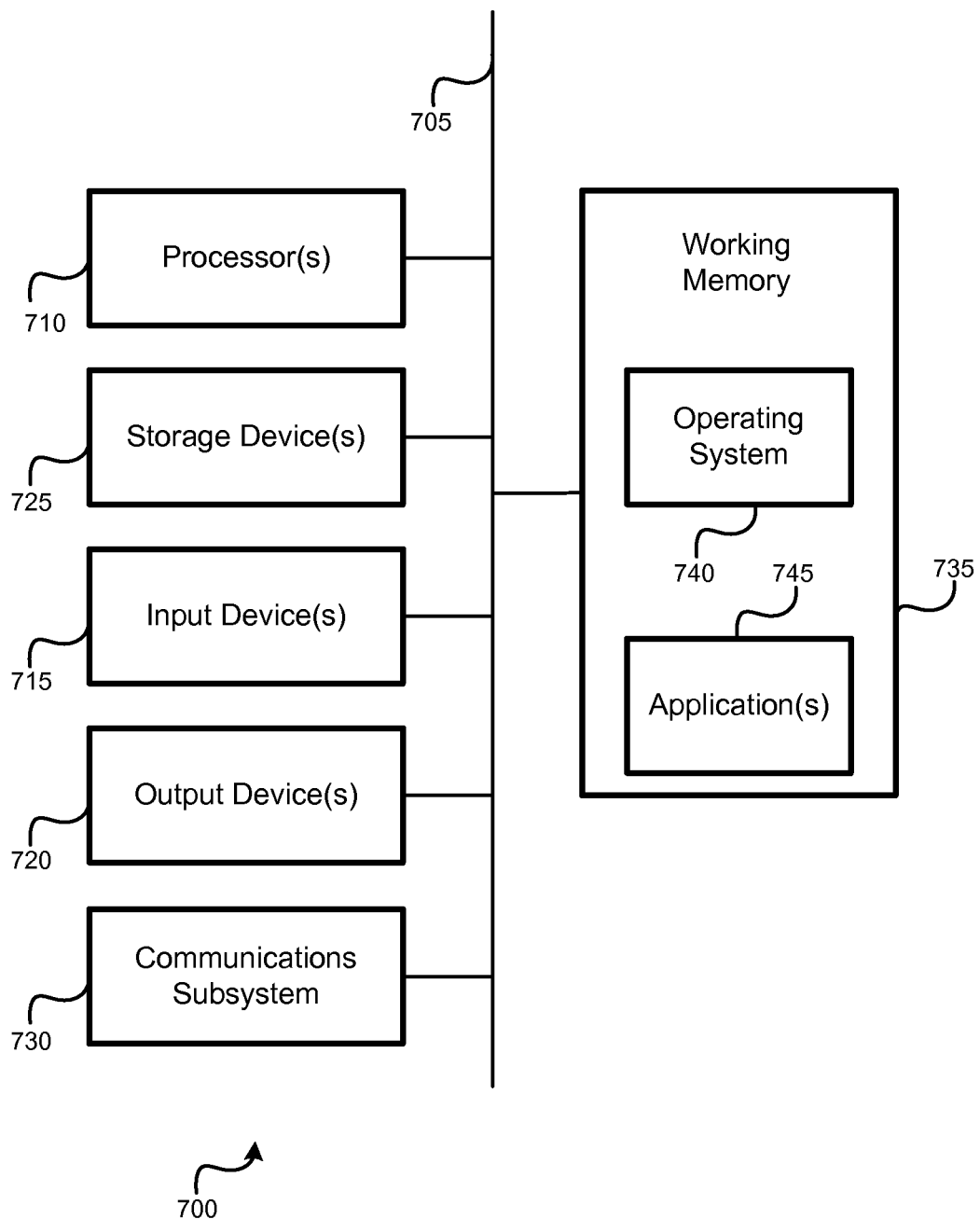
FIG. 7 illustrates an embodiment of a computer system.

A computer system as illustrated in FIG. 7 may incorporate as part of the previously described computerized devices. For example, computer system 700 can represent some or all of the components of the ERP server system, administrator computer system, end user computer systems, remote computer system, proxy servers, load-balancing servers, and web servers discussed in this application. FIG. 7 provides a schematic illustration of one embodiment of a computer system 700 that can perform the methods provided by various other embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, and/or the like); one or more input devices 715, which can include without limitation a mouse, a keyboard and/or the like; and one or more output devices 720, which can include without limitation a display device, a printer and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 725 described above. In some cases, the storage medium might be incorporated within a computer system, such as the computer system 700. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code (e.g., as signals). In many implementations, a computer-readable medium is a physical and/or tangible storage medium. Such a medium may take the form of a non-volatile media or volatile media. Non-volatile media include, for example, optical and/or magnetic disks, such as the storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700. These signals, which might be in the form of electromagnetic signals, acoustic signals, optical signals and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a storage device 725 either before or after execution by the processor(s) 710.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for executing enterprise resource planning software, the method comprising:
   providing, by a computer system, for presentation, a choice among a plurality of modes in which to execute the enterprise resource planning software, wherein the plurality of modes comprises:
     a test mode; and
     a production mode;
   receiving, by the computer system, a first selection of the test mode, wherein:
     the test mode is linked with a test initialization file;
     the test initialization file is configured to cause the enterprise resource planning software to initialize the enterprise resource planning software for a fewer number of users than the production mode;
   initializing, by the computer system, the enterprise resource planning software using the test initialization file;
   receiving, by the computer system, a second selection of the production mode, wherein:
     the production mode is linked with a production initialization file; and
   initializing, by the computer system, the enterprise resource planning software using the production initialization file.

2. The method for executing enterprise resource planning software of claim 1, wherein the test initialization file is configured to initialize a fewer number of processes than the production mode is configured to initialize.

3. The method for executing enterprise resource planning software of claim 1, wherein the test initialization file is configured to initialize a fewer number of network processes and kernel processes than the production mode is configured to initialize.

4. The method for executing enterprise resource planning software of claim 1, further comprising:
   generating, by the computer system, the test initialization file at least partially based on the production initialization file according to a set of predefined initialization file generation rules.

5. The method for executing enterprise resource planning software of claim 1, wherein the plurality of modes in which to execute enterprise resource planning software further comprises a maintenance mode, wherein:
   the maintenance mode is linked with a maintenance initialization file;
   the maintenance initialization file is configured to prevent access to the enterprise resource planning software for a plurality of users.

6. The method for executing enterprise resource planning software of claim 5, further comprising:
   receiving, by the computer system, a third selection of the maintenance mode;
   initializing, by the computer system, the enterprise resource planning software using the maintenance initialization file; and
   executing, by the computer system, the enterprise resource planning software as initialized by the maintenance initialization file.

7. The method for executing enterprise resource planning software of claim 1, wherein the choice among the plurality of modes is provided via a graphical user interface.

8. A system for executing enterprise resource planning software, the system comprising:
   one or more processors; and
   a memory communicatively coupled with and readable by the one or more processors and having stored therein processor-readable instructions which, when executed by the one or more processors, cause the one or more processors to:
     provide for presentation, a choice among a plurality of modes in which to execute the enterprise resource planning software, wherein the plurality of modes comprises:
       a test mode; and
       a production mode;
     receive a first selection of the test mode, wherein:
       the test mode is linked with a test initialization file;
       the test initialization file is configured to cause the enterprise resource planning software to initialize the enterprise resource planning software for a fewer number of users than the production mode;
     initialize the enterprise resource planning software using the test initialization file;
     receive a second selection of the production mode, wherein:

the production mode is linked with a production initialization file; and
initialize the enterprise resource planning software using the production initialization file.

9. The system for executing enterprise resource planning software of claim 8, wherein the test initialization file is configured to initialize a fewer number of processes than the production mode is configured to initialize.

10. The system for executing enterprise resource planning software of claim 8, wherein the test initialization file is configured to initialize a fewer number of network processes and kernel processes than the production mode is configured to initialize.

11. The system for executing enterprise resource planning software of claim 8, wherein the processor-readable instructions, when executed, further cause the one or more processors to:
generate the test initialization file at least partially based on the production initialization file according to a set of predefined initialization file generation rules.

12. The system for executing enterprise resource planning software of claim 8, wherein the plurality of modes in which to execute enterprise resource planning software further comprises a maintenance mode, wherein:
the maintenance mode is linked with a maintenance initialization file;
the maintenance initialization file is configured to prevent access to the enterprise resource planning software for a plurality of users.

13. The system for executing enterprise resource planning software of claim 12, wherein the processor-readable instructions, when executed, further cause the one or more processors to:
receive a third selection of the maintenance mode;
initialize the enterprise resource planning software using the maintenance initialization file; and
execute the enterprise resource planning software as initialized by the maintenance initialization file.

14. A non-transitory processor-readable medium for executing enterprise resource planning software, comprising processor-readable instructions configured to cause one or more processors to:
provide for presentation, a choice among a plurality of modes in which to execute the enterprise resource planning software, wherein the plurality of modes comprises:
a test mode; and
a production mode;
receive a first selection of the test mode, wherein:
the test mode is linked with a test initialization file;
the test initialization file is configured to cause the enterprise resource planning software to initialize the enterprise resource planning software for a fewer number of users than the production mode;
initialize the enterprise resource planning software using the test initialization file;
receive a second selection of the production mode, wherein:
the production mode is linked with a production initialization file; and
initialize the enterprise resource planning software using the production initialization file.

15. The non-transitory processor-readable medium for executing enterprise resource planning software of claim 14, wherein the test initialization file is configured to initialize a fewer number of processes than the production mode is configured to initialize.

16. The non-transitory processor-readable medium for executing enterprise resource planning software of claim 14, wherein the test initialization file is configured to initialize a fewer number of network processes and kernel processes than the production mode is configured to initialize.

17. The non-transitory processor-readable medium for executing enterprise resource planning software of claim 14, wherein the processor-readable instructions, when executed, further are configured to cause the one or more processors to:
generate the test initialization file at least partially based on the production initialization file according to a set of predefined initialization file generation rules.

18. The non-transitory processor-readable medium for executing enterprise resource planning software of claim 14, wherein the plurality of modes in which to execute enterprise resource planning software further comprises a maintenance mode, wherein:
the maintenance mode is linked with a maintenance initialization file;
the maintenance initialization file is configured to prevent access to the enterprise resource planning software for a plurality of users.

19. The non-transitory processor-readable medium for executing enterprise resource planning software of claim 18, wherein the processor-readable instructions, when executed, further are configured to cause the one or more processors to:
receive a third selection of the maintenance mode;
initialize the enterprise resource planning software using the maintenance initialization file; and
execute the enterprise resource planning software as initialized by the maintenance initialization file.

20. The non-transitory processor-readable medium for executing enterprise resource planning software of claim 14, wherein the choice among the plurality of modes is provided via a graphical user interface.

* * * * *